(12) United States Patent
Czàk (10) Patent No.: US 6,411,029 B1
(45) Date of Patent: *Jun. 25, 2002

(54) PLASTIC SHAPED BODY WITH AN INTEGRATED OPTOELECTRONIC LUMINOUS ELEMENT

(75) Inventor: Christian Czàk, Vienna (AT)

(73) Assignee: Schonberg + Cerny GmbH, Vienna (AT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/403,701

(22) PCT Filed: Apr. 3, 1998

(86) PCT No.: PCT/EP98/01958

§ 371 (c)(1),
(2), (4) Date: Dec. 29, 1999

(87) PCT Pub. No.: WO98/49871

PCT Pub. Date: Nov. 5, 1998

(30) Foreign Application Priority Data

Apr. 26, 1997 (DE) ............................................ 197 17 740

(51) Int. Cl.[7] .............................................. H05B 33/10
(52) U.S. Cl. ........................ 313/509; 313/512; 445/24
(58) Field of Search ................. 313/503–512; 445/24

(56) References Cited

U.S. PATENT DOCUMENTS

| | | | |
|---|---|---|---|
| 3,839,129 A | 10/1974 | Neumann ...................... 161/4 |
| 4,957,585 A | 9/1990 | Semff .......................... 156/382 |
| 5,009,687 A | 4/1991 | Kromrey ..................... 65/18.1 |
| 5,108,530 A | 4/1992 | Niebling et al. ............. 156/245 |
| 5,300,858 A | * 4/1994 | Nikaido ....................... 313/503 |
| 5,583,394 A | * 12/1996 | Burbank et al. ............. 313/512 |
| 5,780,965 A | 7/1998 | Cass et al. .................. 313/506 |
| 5,811,930 A | * 9/1998 | Krafcik et al. .............. 313/506 |
| 5,856,031 A | * 1/1999 | Burrows ..................... 313/503 |

FOREIGN PATENT DOCUMENTS

| | | |
|---|---|---|
| DE | 11 12 122 | 8/1961 |
| DE | 41 13 568 C1 | 5/1992 |
| DE | 41 21 151 A1 | 1/1993 |
| DE | 296 04 910 U1 | 8/1996 |

OTHER PUBLICATIONS

English abstract of Document F1 (Derwent Information Ltd.).
English abstract of Document F2 (Derwent Information Ltd.).
English abstract of Document F4 (Derwent Information Ltd.).

* cited by examiner

Primary Examiner—Kenneth J. Ramsey
(74) Attorney, Agent, or Firm—John M. Harrington, Esq.; Cynthia B. Rothschild, Esq.; Kilpatrick Stockton LLP (57) ABSTRACT

The invention relates to a plastic shaped body with an integrated optoelectronic luminous element and to a method for the production thereof. To this end, translucent and cold-stretchable plastic film is three-dimensionally formed at least in the area of the luminous elements and subsequently sprayed with thermoplastic synthetic material. The luminous elements are screen printed onto the unshaped film in the form of luminous fields before the plastic film is formed.

38 Claims, 9 Drawing Sheets

PLASTIC SHAPED BODY WITH AN INTEGRATED OPTOELECTRONIC LUMINOUS ELEMENT

The present invention is a plastic form body with graphically designed surfaces and integrated electro-luminescence elements (EL elements). For example, graphic and electro-luminescence structures are placed on transparent and cold-stretchable thermo-plastic plastic foil by means of silk screen printing (serigraphy), then subjected to a pushing isostatic high-pressure deformation, stamped and placed in an injection mold and back-injected generally on the inner wall by means of suitable thermoplastic plastic resulting in a three-dimensional plastic form component with integrated EL luminous fields.

The DE 44 30 907 A1 makes a three-dimensional electro-luminescence indicator based on an electro-luminescence lights integrated in a three-dimensional formed body. The preformed electro-luminescence lights are formed in a whole piece on a substrate. The disadvantage with this is the separate design of the aforementioned light transmitting layer and the electro-luminescence light and their exact positioning to each other that results in an expensive and costly production process.

A similar three-dimensional electro-luminescence indicator is made known with WO-A-94/14180. Here also, prefabricated, foil formed electro-luminescence lights are applied on carrier material and can be formed together. This has the disadvantage that a separate design of the light transmitting layer of the carrier material and the electro-luminescence light and an exact positioning of the EL-lights in the carrier material is necessary, which makes the production expensive and cost-intensive.

Usually the decorative foils are formed after the vacuum process or the compressed air process to a three-dimensional deep-drawing formed body. Then the graphically designed thermoplastic foils are heated to a temperature above the material's heat distortion temperature so that they can be shaped with relatively little pressure (such as vacuum). These vacuum- and compressed air processes can be used very efficiently with graphically non-critical or neutrally designed foils and form bodies, and function with vacuum processes at a medium pressure of less than 0.95 bar and with compressed air processes at an operating medium pressure of less than 6 bar.

Form components that require exact positioning of graphically designed elements and a very precise image with patterns and/or a great contour sharpness, and which must have a precise form after the deep-drawing process, the procedures of the isostatic high pressure forming according to DE 38 40 542 C1 (also in a somewhat limited way, the so-called hydro-forming) offer advantages.

The production of these types of electro-luminescence fields in connection with the graphic design, must take the very precise positioning of the individual presses and processes together into consideration. The positioning of the nearly transparent ITO-paste graphics, especially, presents a fundamental criterion of quality. U.S. Pat. No. 5,583,394 makes a procedure of recording known that provides invisible positioning markers in a visible light, which, by means of a corresponding light source, are identified with an ultra-violet light for respective reading sensors and, thus, make an exact positioning possible. The disadvantage is that these registration marks can only be applied with additional operating steps and used only with special light sources and special positioning sensors.

Electro-luminescence screen printing pastes are generally made up of inorganic substances and, here again, are very pure ZnS, CdS, $Zn_xCd_{1-x}S$, etc. Compounds of the II and VI group of the periodic system are of importance that generally are doped or activated with Cu, Mn, Ag, etc. Normal colors are yellow, green, green-blue, blue-green and white.

Respective to the state of technology, these types of luminescence pigments can be microencapsulated with diameters of typically 15 to 60 $\mu$m in order to be added to various silk screen printing inks (colors), or non-encapsulated, certainly taking the special hygroscopic characteristics of the ZnS pigments into consideration. Fixing agents are used that, on the one hand, provide good adhesion for the so-called ITO-layers, continue to insulate well, reinforce the dielectric, in order to improve the puncture or disruptive strength with high electrical field strengths and, additionally, have a good water vapor block and so additionally protect the phosphorous pigments to lengthen their life expectancy.

Generally, phosphorous pastes of these types are put on by screen printing or other coating procedures, such as brushing, rolling, coil coating, etc. on transparent plastic foils or glass, which again have a wide transparent electric conducting layer and with it the electrodes for the visual side. Finally, the dielectric and the back-side electrode are produced by printing (press) techniques and/or laminating techniques.

The usual ITO-paste layers (or also tin oxide coatings, etc.) applied by screen printing, however, have the advantage of extensive random geometrical design possibilities, but the vapor-deposited or sputter-deposited transparent and electrical-conducting layers still have the disadvantage of having less optical transparency or translucency and, furthermore, have a much lesser degree of conducting capacity, of at the most some 100 Ohm per square in comparison to some less than 10 Ohm per square with ITO-polyester foil or some less Ohm per square with ITO-coated glass. But the glass can have pastes added (for example, $In_2O_3/SnO_2$), which must, however, be fired at over 500° C. and, therefore, can already deliver with a 0.25 $\mu$m film strength, an optical transparency of greater than 95% and a conducting capacity of a single layer is from 500 to 1000 Ohm per square.

The purpose of the present invention is to produce a three-dimensional graphically designed plastic form body with integrated electro-luminescence elements economically, with a longer life expectancy, increased luminous intensity and guaranteed performance regardless of the existing electric power supply.

In the framework of the present invention it has been determined that the new types of electro-luminescence screen printing inks (colors), new types of ITO (Indium-Tin-Oxide) colors, and new types of insulation and dielectric colors, together with the printing format can be applied, and then the high-pressure formation and the back-injection can be completed by means of thermoplastic plastics by following several ground rules without impairment to the function of the electro-luminescence elements.

According to the invention, the previously discussed procedure of the isostatic high-pressure formation is sufficient for forming the plastic components. So-called cold-stretchable plastic foils are provided with printing ink (colors) that, together with an operating temperature below the distortion temperature of the thermoplastic foil's plastic, completes a push-type forming operation to a three-dimensional plastic form component with greater image precision.

Advantageously, isostatic high-pressure forming, especially the push-type stamping of the plastic components with preferably several 100 bar compress air (typically 50 to 300 bar), very short cycle times with outstanding controlled and even formation, which results in greater image accuracy and, furthermore, produces the same types of formed components with less heat (which means the time-consuming cool-down phase is discontinued), outstanding dimensionally stable formed bodies and constant contours (which remain the same), which is really essential for the final stamping process and the insertion into the injection molding die, increasing the quality.

Other processes for forming the plastic foil three-dimensionally are also possible (for example, mechanical shaping or mechanical stamping methods). A re-forming of the plastic foil placed in an injection molding die can itself result from the injection of the thermoplastic plastic material.

The present invention is also based on the cognition that for a product of this type, known screen printing pastes with phosphorous pigments, especially in the microencapsulated form (but also in the non-encapsulated form) based on respective doped compounds of the II and VI groups of the periodic system, especially in forms with Cu, Mn, Ag, etc., doped ZnS pigments in combination with special cold-formable polycarbonate substrate or the various mixtures of polycarbonate and polyethyleneterephthalate (PETP) or polyalkyleneterephthalates are very suitable. Mixtures of additional luminous colors, especially those that, through the electro-luminescence radiation for light excitation and release of respective radiation with wide ranges of discretionary spectrals (as narrow banded wave-length peaks) work very positively and effectively.

In another development of this procedure, the color printing can be imbedded sandwich-like between two layers of foil material. This results in less problems with the back-injection of thermoplastic plastics, which in this case of color printing, are better protected by the additional foil against distortion and melting in the injection area.

In another typical embodiment, a layout of a luminous field has not only two electrical connections, but many fields; for example, with various color luminous fields, such as lettering and/or symbols.

In relation to the necessary position exactness, the individual printings have been established within the framework of the present invention; that the registration of the various layers and processes can be realized manually in general by means of registering marks in visible luminous areas (and also automatically), and that each layer based on the nearly transparent ITO-paste can be controlled and registered very well concerning the preciseness of the position and the constancy of the process by means of electrical test configurations in connection with conducting paste structures. Additionally, the allowable surface resistance and/or contact or transition resistance of the ITO-paste contacts to the conductor will be evaluated and recorded.

The invention at hand will be explained more closely by several embodiments and should, thereby, emphasize the invention-related characteristics:
Shown.

Figure 1:
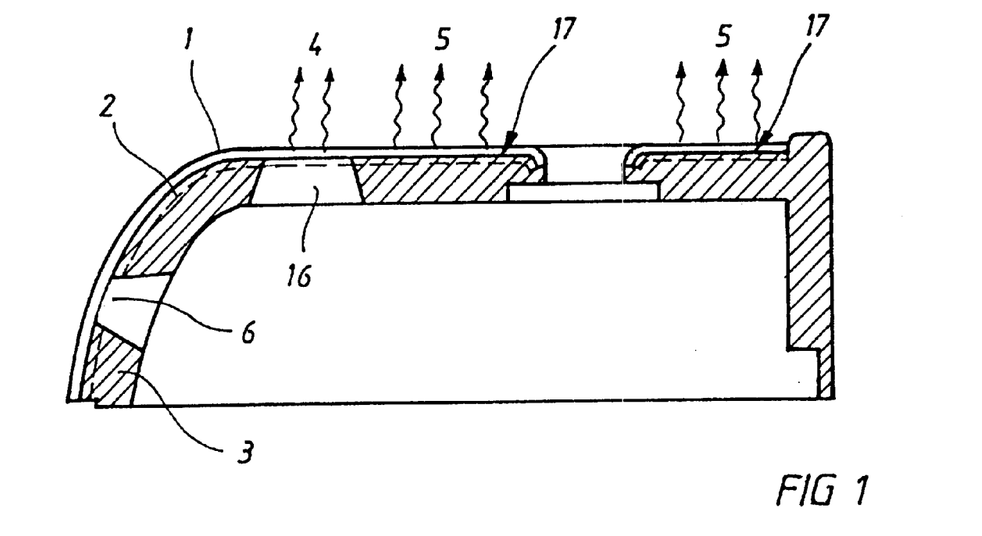
FIG. 1: a section through a three-dimensional plastic form body with EL-luminous fields in accordance with an embodiment of the present invention.

According to FIG. 1, a typically 100 to 300 $\mu$m thick and transparent foil (1), made preferably of polycarbonate, such as polycarbonate-polyester mixture, with specification-determined surfaces (as, for example, high gloss finish or satin matte finish) provided on the inner side with graphic print (press) (2), preferably the screen printing process and the respective screen printing inks are sufficient for application. However, a combination of other printing processes (for example, offset-printing for graphic designs) can be used. Digital printing processes especially (such as, for example, ink jet processes) are fundamentally suitable. In this graphic printing (2), luminous fields (17) are imbedded, which, likewise (for example, in screen printing process) can be applied to the inner side of the foil (1). In the next step the printed decorative foil (1) is subjected to a push-type isostatic high-pressure forming in order to attain its pre-determined three-dimensional shape. Finally, the formed foil (1) with thermoplastic plastic (3) is back-injected. The contact of the electro-luminescence fields (17) follows from a released contact surface (6).

Figure 2:
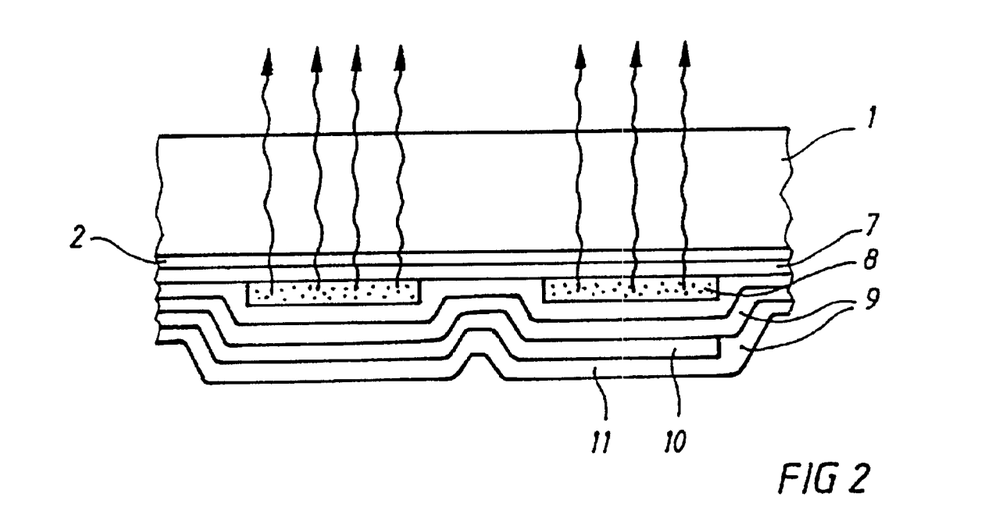
FIG. 2: an enlarged detailed section of FIG. 1.

FIG. 2 shows an enlarged detailed section of the decorative foil-injection mold body according to FIG. 1. In the presented case, the first printing step of the graphic design (2) with opaque (covering) and transparent or translucent colors is completed (that is, applied to the foil material [1]). Finally an extensive transparent cover electrode (7) (for example, in the form of an ITO-screen printing paste) and the desired structure are applied. On this ITO-layer (7), the electro-luminescence pastes (8) are pressed in predetermined structures; whereby, not only an electro-luminescence paste (8) can be used with an electro-luminescence color, but also with many different radiating EL-colors. The EL-colors can especially be mixed with daylight luminous (fluorescent) colors in order to achieve the desired color effect when activating the EL-fields (17). Furthermore, these EL-elements (7) can be used with various circuitry wiring systems, especially with the separate design of the silver conducting paste electrodes (7). Finally on the EL-paste printing (7), insulation printing colors (9) are usually achieved in two printing processes with varying screens to prevent marks or defects and to produce the so-called dielectric. Usually these insulation pastes (9) are white in color and, therefore, have a reflection effect for the EL-radiation.

In connection to these insulation layers (9), a silver conducting paste structure (10) is pressed on, thus producing the base electrodes. Normally the surrounding ITO-paste pressing is simultaneously reinforced in what is generally described as the "Bus-bar" technique, so that an even and constant electrical field strength can be attained over the total EL-luminous field (17). Furthermore, the printing of the silver paste (10) also strengthens the connecting surfaces of the ITO-electrodes (7), but these reinforcements are understood in the sense of the reduction of electrical surface's resistance.

Frequently it is advantageous to cover these various screen-printing layers (7–10) additionally with a polyurethane dispersion coating (11) in order to subsequently maintain an optimal connection of the various thermoplastic injection mold compounds. These cold-stretchable and graphically designed EL-decorative foils (1) are usually subjected to multiple uses of a push-type isostatic high-pressure forming and for this purpose, are typically warmed from 40° C. to 80° C. This warming is, however, certainly below the heat distortion temperature of thermoplastic plastics of the decorative foil (1), because otherwise there would not be such a high degree of image accuracy of the deep-drawn printed picture. In connection to the deep-drawing process, there is an exact contour stamping of this three-dimensional object and it is then placed in an injection mold die, and in the presented case is back-injected by means of a suitable thermoplastic plastic (3) mentioned in the beginning. Therefore, the selection of the injection site on the form must be made very carefully and the graphic design must be taken into consideration in order to prevent distortions, deviations and re-melted spots. Generally the connecting places for the EL-luminous fields (17) are already kept free in the injection mold die, so that the contacts of the EL-electrode connections (6) take place by means of spring finger contact, crimping or electrical conducting tape. Often the silver conducting paste connecting surfaces are still additionally subjected to by passive, electrical conducting layers in relation to the screen printing processes and so attains increased protection again oxidation, resulting in a longer life expectancy of these connections. In another development of this embodiment, electrical connecting elements can also be crimped or cramped in the three-dimensionally formed decorative foils and this unit can be placed together or also behind each other in the injection mold die and be back-injected; therefore, attaining extreme mechanical, as well as electrical, load-bearing connection elements for the EL-luminous fields.

Figure 3:
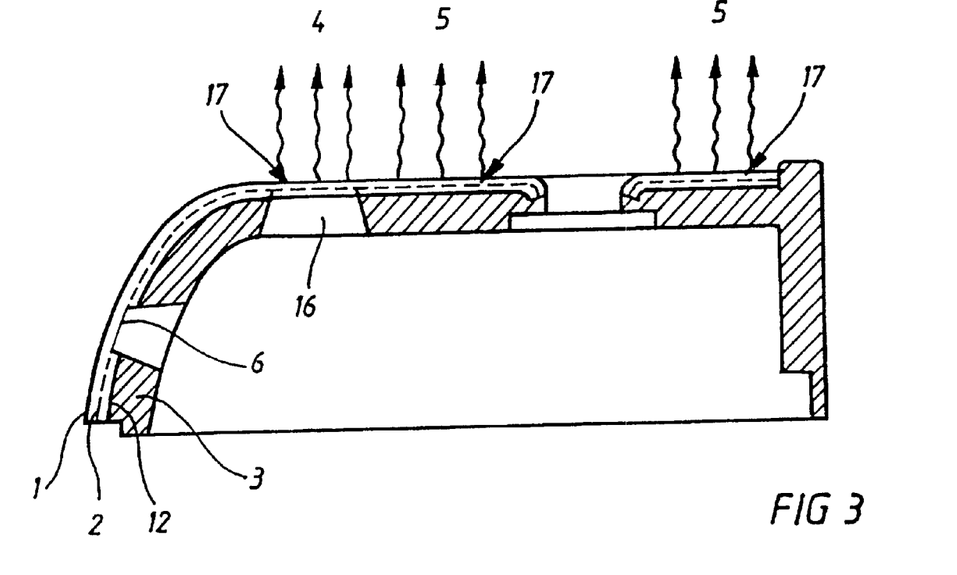
FIG. 3: a section through another three-dimensional plastic form body ID with EL-luminous fields in accordance with an embodiment of the present invention.

FIG. 3 shows, that in addition to the previous embodiment, a thermoplastic plastic foil (12) can be laminated on the underside of the graphically designed EL-decorative foil (1). The adhesive bond can, depending on the required specifications, achieve a thermoplastic hot-melt screen printing coating by the screen printing technique of a polyurethane dispersion coating; that the additional thermoplastic foil (12) can be applied by a high melting process to bond with the graphically designed EL-decorative foil (1) or this thermoplastic foil (12) can have a corresponding additional coating (for example, a corresponding hot melt coating) and can by a lamination process attain a sandwich-type bonding foil. The advantage of this additional foil on the inner side is that the graphic and color design of the decorative foil (1) has greater protection on the injection side of the injection mold die and permits, especially the realization of critical geometries that often have inconvenient choices of injection positions, which would result in high injection temperature defects and color distortions in the injection sites, which can be extensively prevented by this additional foil.

Figure 4:
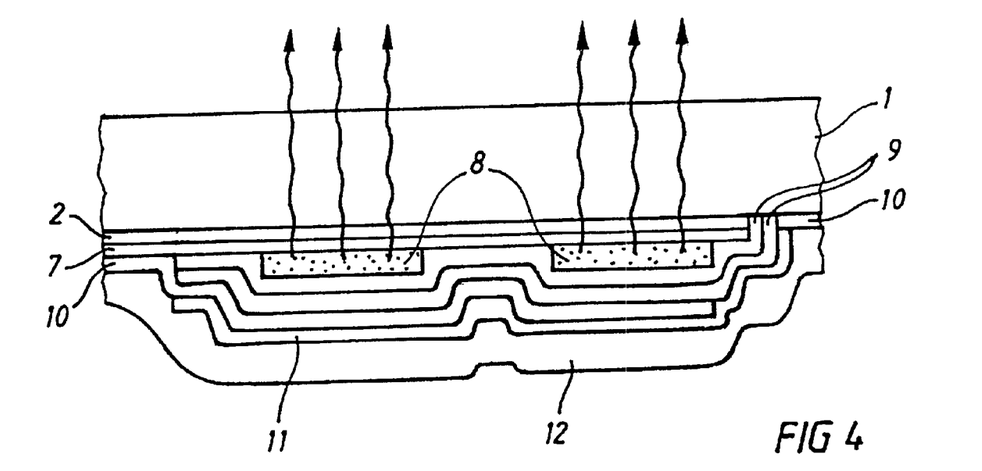
FIG. 4: an enlarged detailed section from FIG. 3.

FIG. 4 shows an enlarged section through the embodiment, according to FIG. 3. The sequence of the applied layers correspond basically to FIG. 2. However, an additional thermoplastic plastic foil layer (12) is applied over the described layer succession (7–11).

Figure 5:
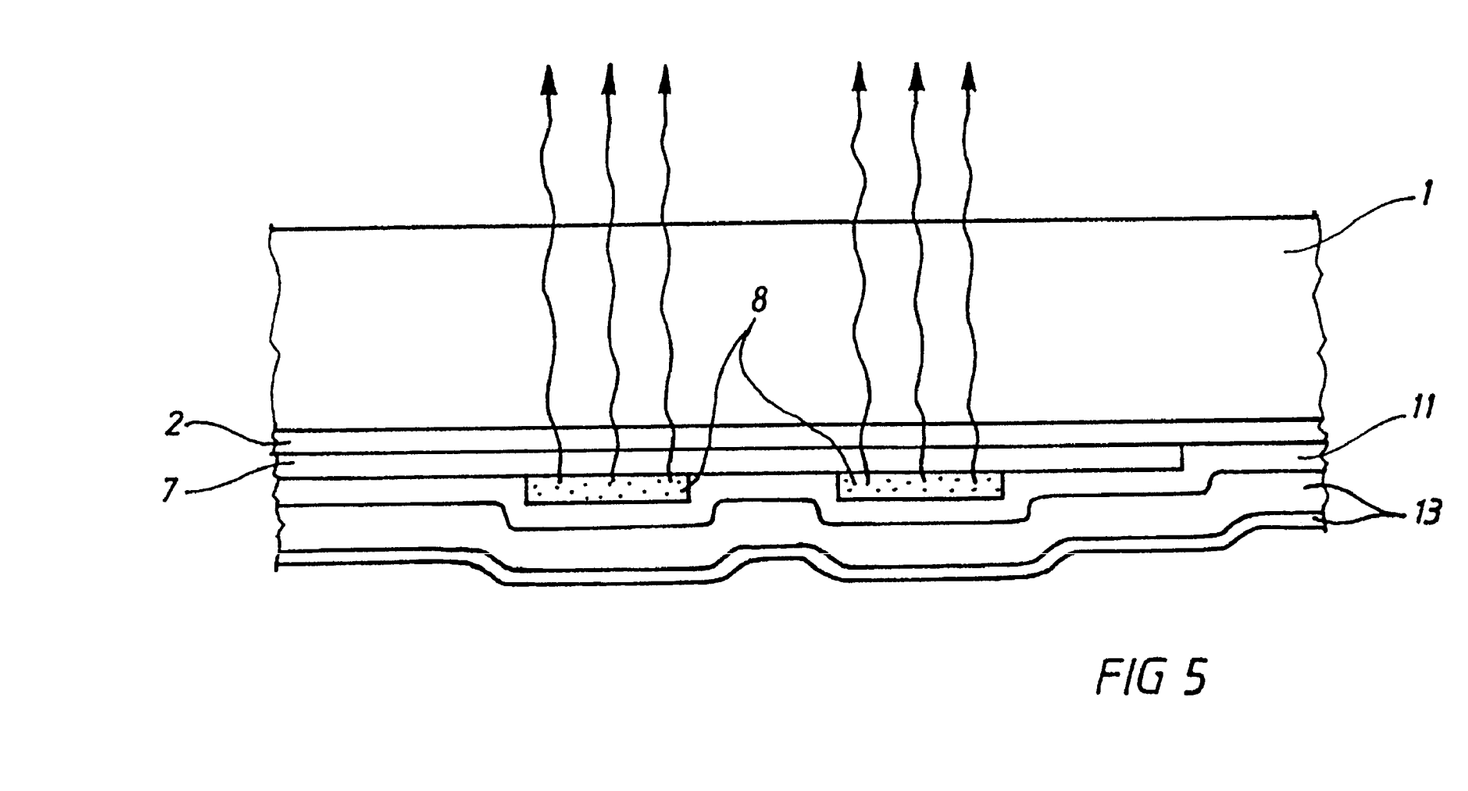
FIG. 5: a section through another embodiment of a three-dimensional plastic form body with EL-luminous fields.

According to FIG. 5, instead of the insulation layer (9) and the back electrode layer (10), a metallized plastic foil (13) is laminated on by means of screen printing. The adhesive bond can, depending on the required specifications, by screen printing technique of a polyurethane dispersion coating (11), attain a thermoplastic hot melt screen printing coating, the additional metallized foil (13) can be applied by a high melting process to bond with the graphically designed EL-decorative foil (1) or this metallized foil (13) has a corresponding additional coating (for example, a respective hot melt coating) and can by a lamination process result in a sandwich-type bonding foil. The advantage of this embodiment lies in the smaller amount of printings (pressings), in the higher quality of the insulation layer and the bonded good formability. The fundamental disadvantage of this embodiment lies in the limited potential to trigger the EL-luminous fields (17). Generally in this case only a common "steerable" EL-luminous element (17) is formable and, furthermore, this type of embodiment shows no cost-effective solution with regard to energy supply, since the total surfaces work extensively and not only individual selective surfaces. This disadvantage could in this respect be used in another embodiment since the usual dielectric layers (9) with the second screen printing process have barely more than 20 to 30 $\mu$m thickness and metallized plastic foils must be laminated on with this thickness in order to achieve the same kind of electrical supply some $10^6$ volt/cm on an electric field strength for the purpose of EL-excitation. This special embodiment is only typically 50 $\mu$m thick and back-sided metallized plastic foil (13) is used; the three-dimensional design is selected so that only in the areas of desired EL-excitation, a stretching of the materials (for example, around 100%) occurs and, through which, this as dielectric functioning layer, is reduced by half and so with a normal EL-distribution voltage builds up a sufficiently high electric field so that EL-excitation can take place in these selective areas.

Figure 6:
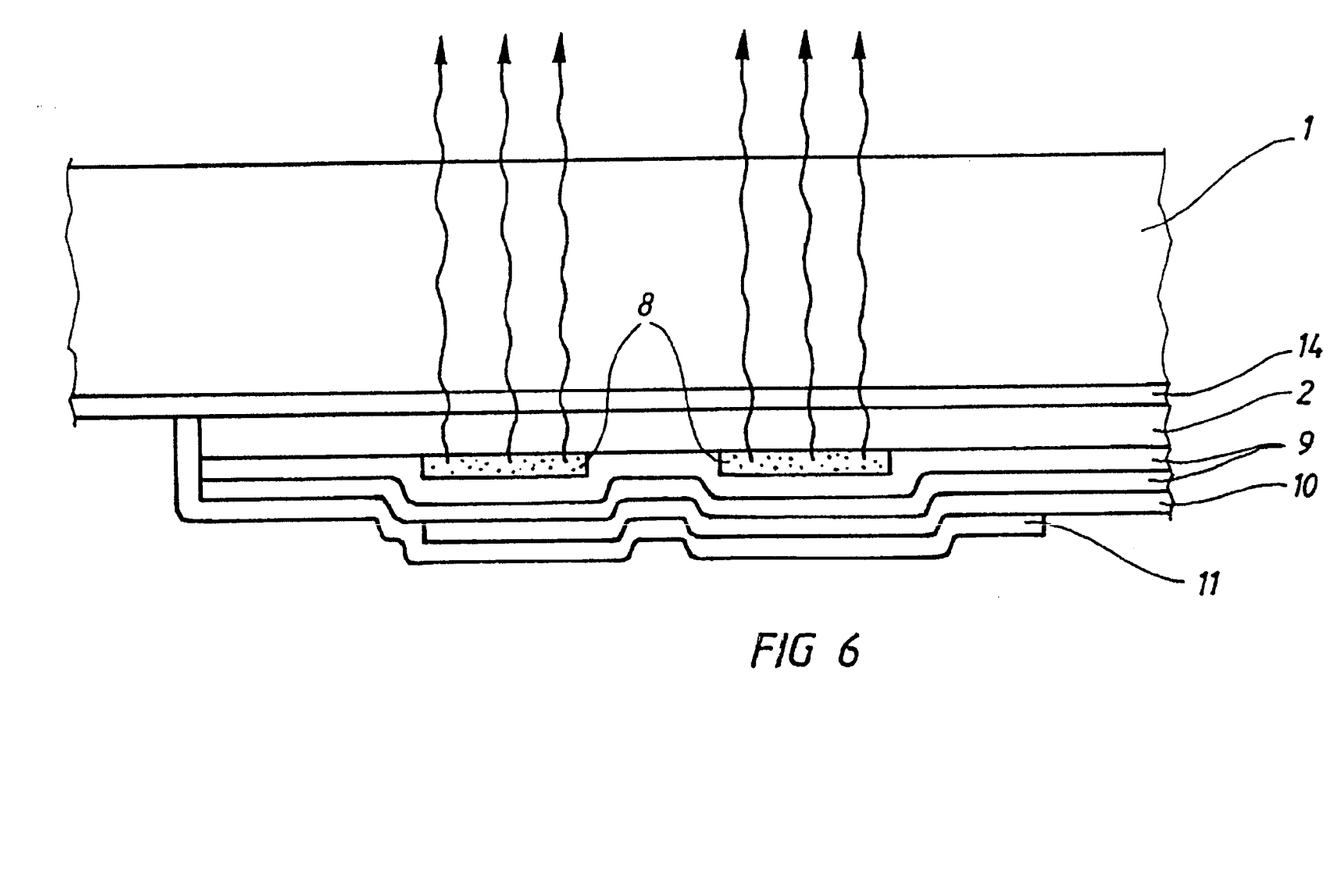
FIG. 6: a section through another embodiment of a three-dimensional plastic form body with EL-luminous fields.

FIG. 6 shows instead of the ITO-paste coating (7) of the decorative foil (1) by means of screen printing, a transparent decorative foil with ITO-sputter coating (14) and/or reflective semi-transparent layers. This embodiment has the fundamental advantage that this type ITO-coated transparent foil (14) has a very high optical transparency, typically in areas greater than 85% up to 95% and, additionally, offers very small surface resistance values, typically in the area of 100 to 1000 Ohm per square. In this way the EL-luminous element (17) can achieve a higher optical luminous intensity with also correspondingly less size. The disadvantage, however, beside the high price for this type of coated plastic foil (14), is the complete flatness of the electrical conducting layer and the small level of formability. The problem with regard to the limited formability without electrical interruption can, to this extent, be solved as the usual EL-fields (17) in any case usually don't have strong three-dimensional forms and in the cases of strong formations, the electrical conducting capacity's so-called "Bus-bars" (that are in general silver paste structures) are used. These electric conducting polymer pastes are, however, relatively good plastic and formable and can produce a protected contact for this transparent cover electrodes. Moreover, no additional printings (pressings) are necessary because by corresponding designs of the insulation structures of these ITO-structures, reinforced conducting paste structures can simultaneously occur with the base electrode pressing (printing).

Figure 7:
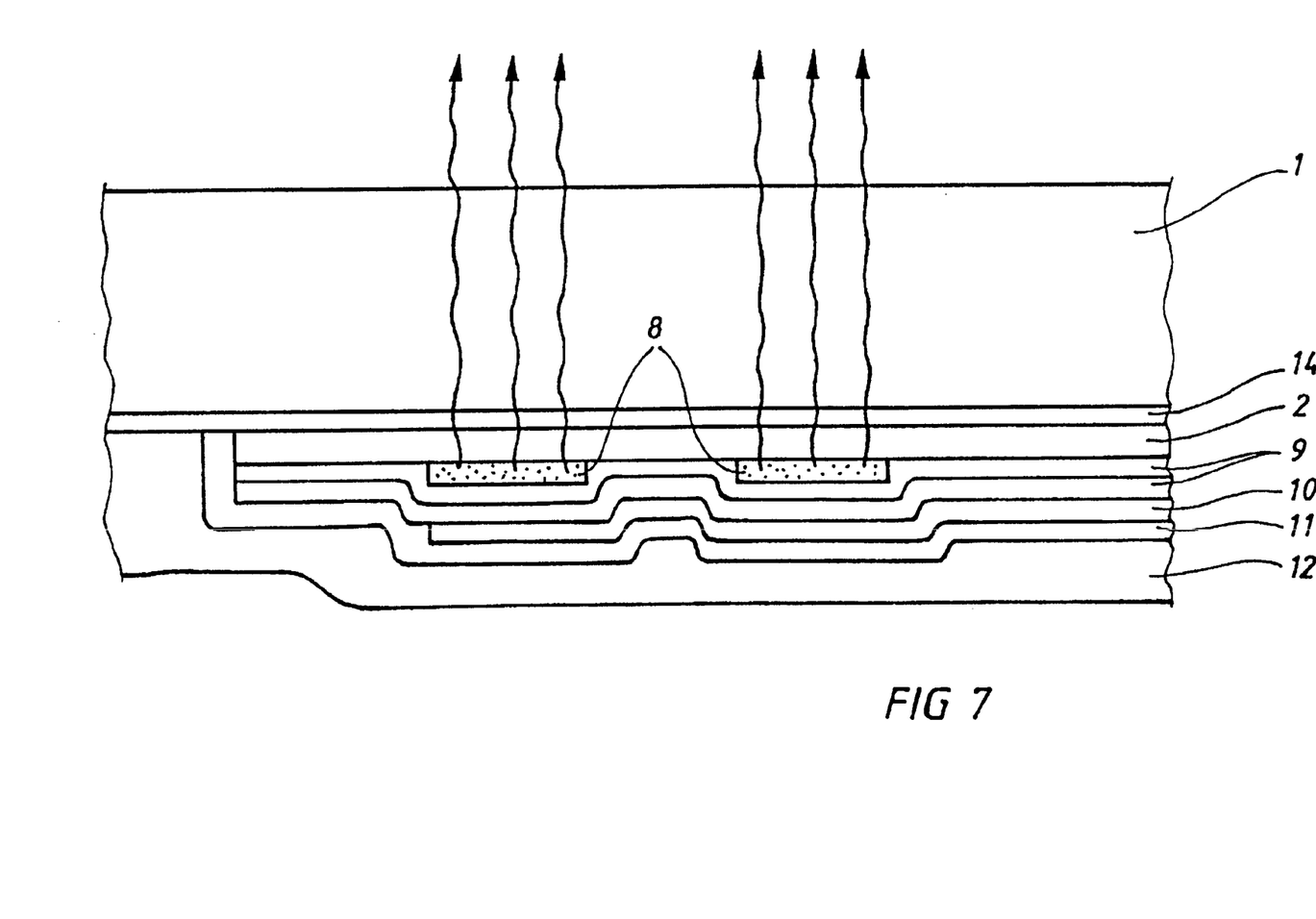
FIG. 7: a section through another embodiment of a three-dimensional plastic form body with EL-luminous fields.

According to FIG. 7, instead of the ITO-paste coating (7), the decorative foil (1) by means of the screen printing, a transparent decorative foil (1) is used with the ITO-sputter coating (14) and/or reflective semi-transparent layers and, additionally, as with the previous embodiment, a thermoplastic plastic foil (12) is laminated on the underside of the graphically designed EL-decorative foil.

Figure 8:
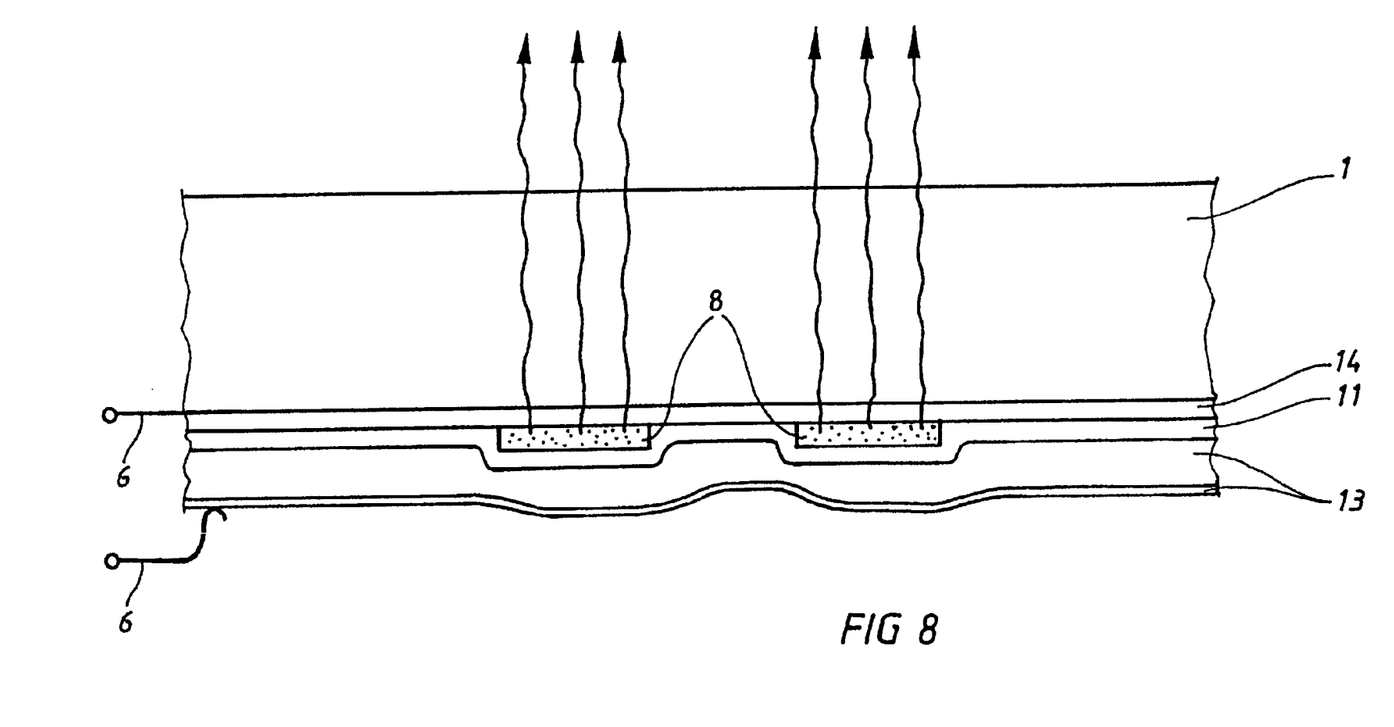
FIG. 8: a section through a modified embodiment of a three-dimensional plastic form body with EL-luminous fields.

In FIG. 8, instead of the ITO-paste coating (7), the decorative foil (1) by means of screen printing a transparent decorative foil (1) is used with ITO-sputter coating (14) and/or reflective semi-transparent layers and instead of two-stage insulation printing (pressing) (9) and its silver paste printing (pressing) (10), a metallized thermoplastic plastic foil (13) is laminated on the underside of the graphically designed EL-decorative foil (1).

Figure 9:
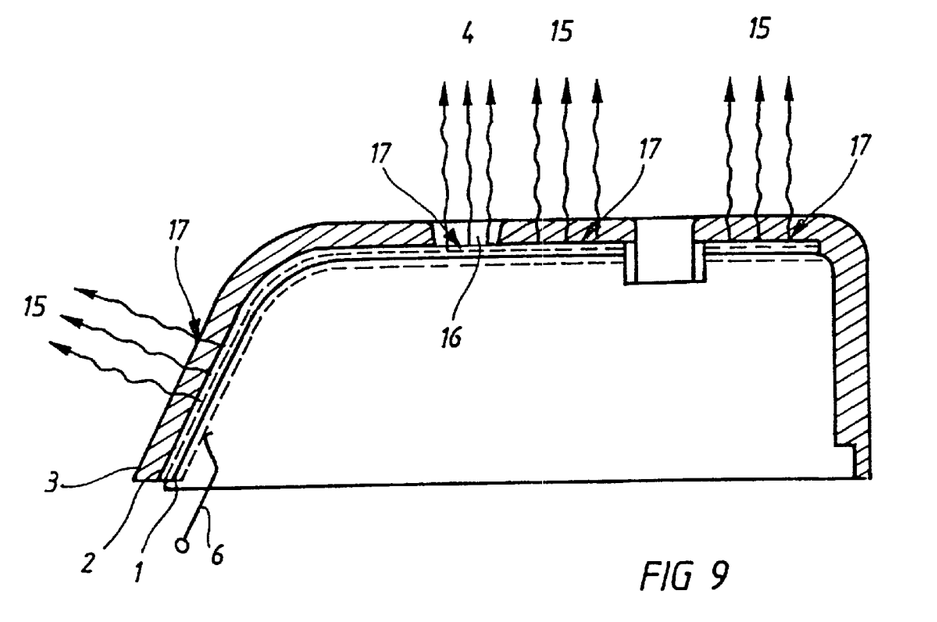
FIG. 9: a section through a three-dimensional plastic form body with EL-luminous fields, but in this case, the injection occurred from the outside; that is the three-dimensional decorative foil component is applied to the core of the injection mold.

FIG. 9 shows the injection of the decorative foil (1) with thermoplastic plastic (3) can also take place from the outside; that is, the three-dimensional decorative foil component (1) is applied on the injection mold die core. For this, the sprayed-on thermoplastic plastic (3) has corresponding notches (16) in the area of EL-luminous (17) in order to allow the light to emit out or at least in the area of the EL-luminous surfaces (17) to be formed transparent or translucent.

Figure 10:
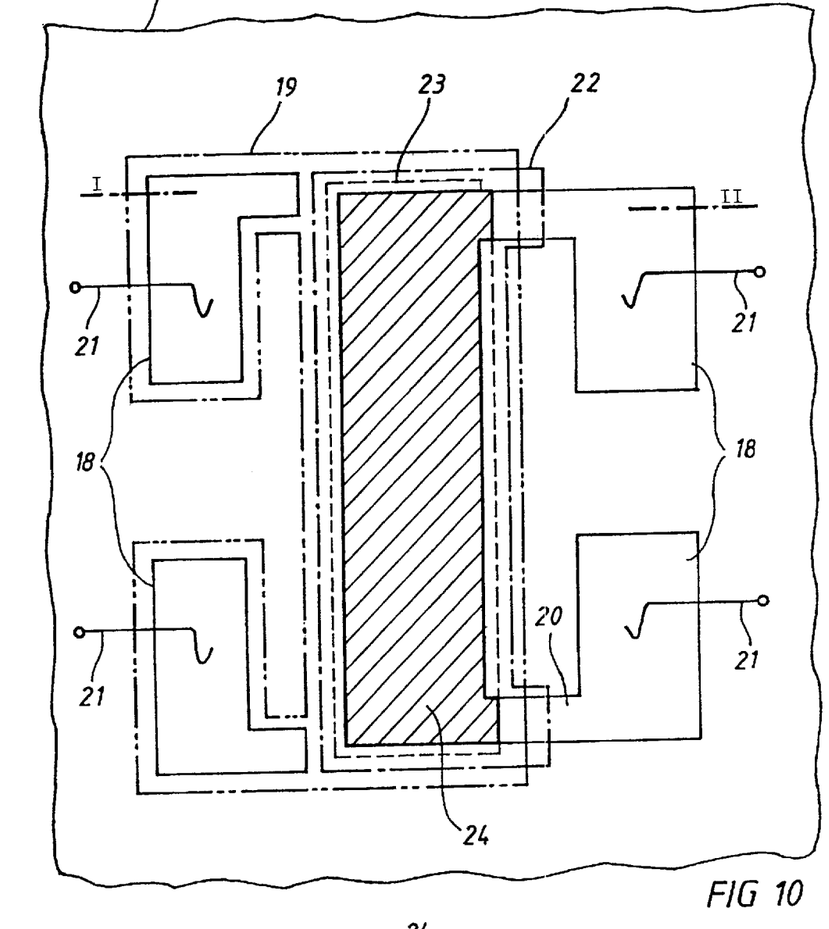
FIG. 10: an overview of a test geometry to check the preciseness of the positions of the various pressure (printing) geometries and especially the electrical conducting and nearly transparent (and therefore difficult to identify) ITO-screen printing geometry.

FIG. 10 is an overview of a test geometry to check the position preciseness of the various pressure geometries and, especially the electric-conducting and the nearly transparent and therefore, difficult-to-identify ITO-screen printing geometry. On a carrier substrate [for example, a foil (1)] according to the previously described process method, an electro-luminescence element is pressed on. On the basis of a typical embodiment there are four connection surfaces (18) (for example, made of silver conducting paste); whereby, two surfaces are each for the ITO-structure (19) and two surfaces are each for the silver, such as conducting paste structure (20). The connection surfaces (18) of the ITO-paste structure (19) are reinforced with silver paste so that a point contact finger (21) can reach a secured electrical contact, which, additionally, is relatively non-critical from the standpoint of its position. By special selection of the geometry, almost every determined tolerance of the diverse press structures is checked very easily by this electrical test adapter and recorded. So, the various structures must simply be formed respective to the checked tolerances (for example, always be printed (pressed) with 0.1 mm or also 0.2 mm projection). Should, however, an error in the positioning in the individual press process take place, the application of the respective stress test will reveal the amounts of resistance and these can very easily be coordinated to the particular errors. Furthermore, these electrical test geometrics can also check the insulation printing (pressure) (22) and the EL-printing (pressure) (23) as to their positioning preciseness, and additionally, can also conduct insulation tests and surface resistance tests. Moreover, on the basis of these test geometries, certain selected EL-potential (stress) and optically the luminous field (24) can also be checked. Furthermore, this EL-luminous field (24) can also be checked with fully automatic color measuring sensors, such as intensity measuring sensors, for required specification values.

Figure 11:
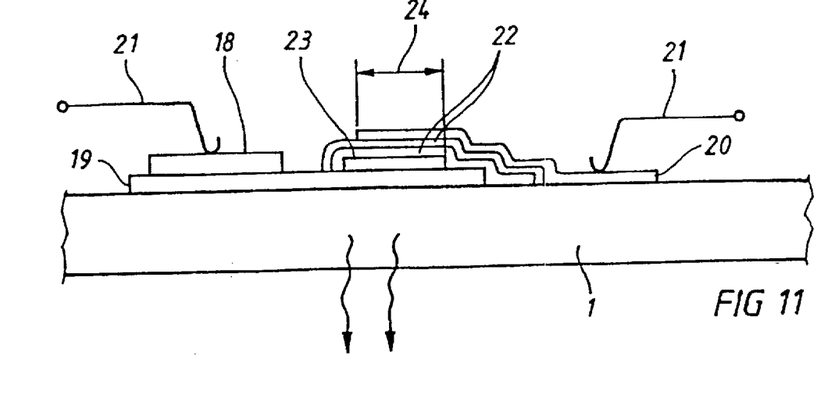
FIG. 11: a section through the system according to FIG. 10.

FIG. 11 shows a section of the system, according to FIG. 10, again.

Figure 12:
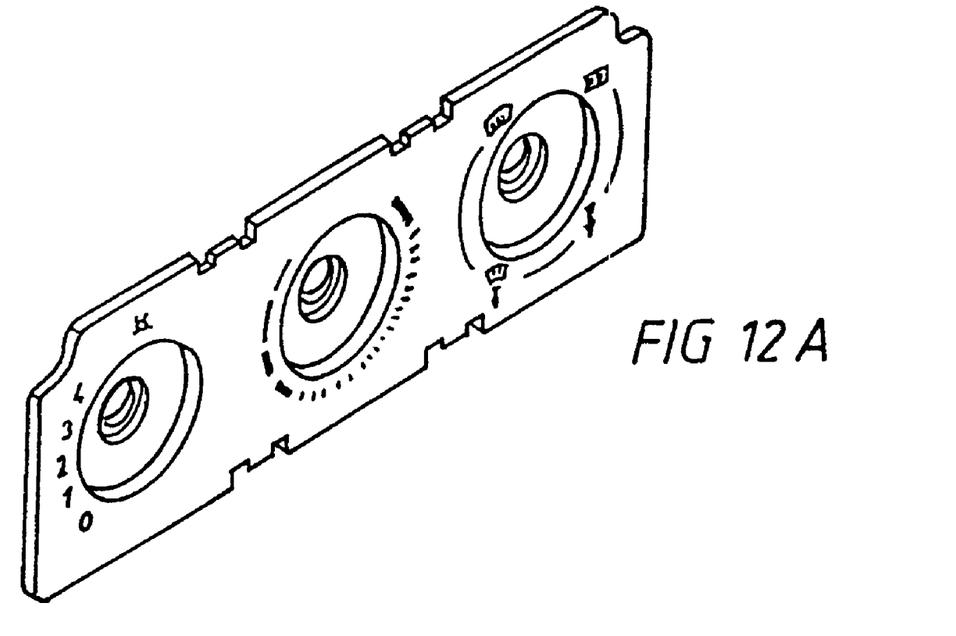
FIG. 12: an overview of the three-dimensionally designed plastic form body with graphically designed surface and electro-luminescence luminous fields.

FIG. 12 show examples of three-dimensional surface forms with built-in electro-luminescence elements, in which EL-elements for dial illumination, functional indicators or others are placed.

DRAWING LEGEND

1. Plastic foil (decorative foil)
2. Printed (pressed) coating (for graphic design and EL-structure)
3. Back-injection (thermoplastic plastic)
4. EL-light emission range (without back-injected plastic)
5. EL-light emission range (with back-injected plastic)
6. Bonding of the diverse EL-electrodes
7. TO-paste printing (pressing)
8. El-paste print (including various daylight luminous color mixtures)
9. Insulation printing (pressing) (=dielectric, insulator)
10. Silver paste print (press)
11. Polyurethane dispersion coating
12. Thermoplastic plastic foil
13. Metallized thermoplastic plastic foil
14. ITO-sputter layer
15. EL-light emission range (with front-sided plastic injection)
16. Notch
17. Luminous fields
18. Connection surface
19. ITO-structure
20. Conducting paste structure
21. Contact finger
22. Insulation printing (pressing)
23. Electro-luminescence print
24. Luminous field
*ITO=Indium-Tin-Oxide
*EL=Electro-luminescence

What is claimed is:

1. A plastic form body having one or more integrated, opto-electronic active luminous fields comprising;
    at least one translucent, cold-stretchable, three-dimensionally deformed plastic foil;
    graphic printing;
    an electro-luminescent layer comprising at least one electro-luminous element at least partially embedded in said graphic printing;
    a first conducting surface positioned between the translucent plastic foil and the electro-luminescent layer;
    a second conducting surface positioned on the side of the electro-luminescent layer not in contact with the first conducting surface; and
    a thermoplastic film sprayed on the body to comprise a three-dimensional molding,
    wherein the luminous fields comprise distinct regions of the plastic form body capable of emitting radiation.

2. A plastic form body according to claim 1, wherein the luminous fields are electro-luminescence fields further comprising two, electrically insulated electrodes, namely, a first electrode comprising a base electrode and a second electrode comprising a cover electrode; and an electro-luminescence layer between the first electrode and the second electrode.

3. A plastic form body according to claim 2, further comprising at least one dielectric layer or insulation layer located between :the electro-luminescence layer and the base electrode, wherein the electrodes and the electro-luminescence layer are applied as a screen printing paste, and the layers formed by screen printing are deformable at an operating temperature below a heat distortion temperature of the plastic foil.

4. A plastic form body according to claim 3, wherein the insulation layer and base electrode comprise a metallized, transparent foil having a thickness of about 20 to 30 μm laminated on the electro-luminescence layer or on a cover layer positioned on the side of said electro-luminescence layer opposite the translucent, cold-stretchable, three-dimensionally deformable plastic foil.

5. A plastic form body according to claim 2, wherein the electro-luminescence layer comprises organic or inorganic substances comprising plastically deformable dielectric screen printing colors added as a fine powder or microencapsulated components having diameters of substantially 10 to 60 μm and being substantially insensitive to water vapor.

6. A plastic form body according to claim 2, wherein the cover electrode is a substantially transparent and electrical-conducting electrode comprising indium-tin-oxide (ITO) paste.

7. A plastic form body according to claim 2, wherein the cover electrode comprises an indium-tin-oxide (ITO)-sputter layer or a reflective semi-transparent layer, and is printed as an electric conducting polymer paste in an area of stronger deformation or in areas outside the luminous fields.

8. A plastic form body according to claim 1, further comprising an additional thermoplastic foil on an inner side and/or outer side of the plastic foil, and elements forming a graphic design between the additional thermoplastic foil and the plastic foil.

9. The plastic molding body of claim 1, wherein the side of said plastic foil closest to said electrofluorescent regions comprises graphic printing.

10. The plastic molding body of claim 9, wherein said luminous fields are embedded in at least part of said graphic printing.

11. The plastic form body of claim 1, wherein the thermoplastic layer is sprayed on the exterior surface of the three-dimensionally deformed plastic foil.

12. The plastic form body of claim 1, wherein the thermoplastic layer is sprayed on the side of the body opposite to the three-dimensionally deformed plastic foil.

13. A process to produce a plastic form body having at least one electroluminescent device formed therein, comprising the following steps:
preparing a transparent, cold-stretchable, thin plastic foil substrate;
depositing a graphic design as an opaque covering and/or translucent screen print formation;
depositing a substantially transparent, electric-conducting cover electrode layer;
depositing an electro-luminescence layer;
depositing an insulating, dielectric layer;
depositing an electric-conducting base electrode layer;
forming and stamping out at least one three-dimensional plastic foil substrate from the thin plastic foil substrate;
positioning at least one of said three-dimensional plastic foil substrates in or on a three-dimensional support; and
depositing a thermoplastic reinforcement onto said at least one supported three-dimensional plastic foil substrate.

14. A process to produce a plastic form body having at least one electroluminescent device formed therein, comprising the following steps:
preparing a transparent, cold-stretchable, thin plastic foil substrate covered on an entire surface on an inner side with an indium-tin-oxide (ITO)-layer and/or reflective semi-transparent layers in sputter processes;
depositing an opaque covering and/or a translucent screen printing formation in a selected graphic design;
depositing an electro-luminescence layer;
depositing an insulating, dielectric layer;
depositing an electric-conducting base electrode layer by means of screen printing;
forming and stamping out at least one three-dimensional plastic foil substrate from the thin plastic foil substrate;
positioning at least one of said three-dimensional plastic foil substrates in or on a three-dimensional support; and
depositing a thermoplastic reinforcement onto said at least one supported three-dimensional plastic foil substrate.

15. A process according to claim 13, wherein the three dimensionally formed plastic foil substrate is placed in an injection molding die and is back-injected with suitable thermoplastic, wherein at least one electrical connection surface for the electro-luminescence electrodes remains substantially uncovered.

16. A process according to claim 13, wherein the three-dimensional formation of the plastic foil substrate is accomplished by isostatic high pressure formation with a pressure of printing fluids greater than 20 bar, wherein the operating temperature remains below a distortion temperature of plastic.

17. A process according to claim 13, wherein the three-dimensional forming further comprises inserting a flat, unformed plastic foil substrate into an injection mold die; the injection mold die being warmed to an operating temperature lower than a distortion temperature of plastic and shaping occurs by mainly mechanical shaping, wherein final shaping results mainly from a thermoplastic injection compound.

18. The process according to claim 17, wherein a layer of thermoplastic is applied to the outside of the body by spraying.

19. A process according to claim 13, wherein the plastic foil substrate is formed three-dimensionally by a mechanical stamping process, thereby allowing the plastic foil substrate to be inserted pre-shaped into an insertion mold die.

20. A process according to claim 13, further comprising an intermediate step wherein a screen printing layer based on an aqueous polyurethane dispersion or polyurethane color-containing solvent to optimally bind a thermoplastic compound is applied on the base electrode layer, wherein electrical connecting surfaces for electro-luminescence electrodes remain substantially uncovered.

21. The method of claim 20, wherein upon application of said screen printing layer, at least one window to the interior remains substantially uncovered.

22. A process according to claim 13, wherein the electro-luminescence layer is screen printed, and further comprises daylight luminous fluorescent pigments in addition to electro-luminescence pigments.

23. A process according to claim 13, further comprising forming luminous fields that are steerable luminous fields which are nested and separated such that a base electrode connection of a inner-lying luminous field can be guided by silver conducting paste by means of cross-over technology whereby additional local insulating print layers are placed on outwardly lying electrode connections so that inner-lying base electrode connections can be insulated electrically as they are guided outwardly, whereby base electrode connections can be electrically triggered separately.

24. A process according to claim 13, wherein a thin thermoplastic foil is laminated on the base electrode layer, thereby allowing back-injection of thermoplastic at a higher temperature load and using especially complicated injection positions with correspondingly high temperatures.

25. A process according to claim 13, further comprising injecting thermoplastic on both sides on the plastic foil substrate, allowing optical lens effects and/or light modifier effects to be achieved; wherein the thermoplastic comprises a composition selected from the group consisting of polycarbonate (PC), polymethylmethacrylate (PMMA), transparent acrylonitrile-butadiene-styrene (ABS), polyamide (PA), polypropylene (PP) plastics, and respective mixtures of the foregoing plastics.

26. A process according to claim 13, wherein the insulating dielectrical layer and the base electrode layer are not deposited by means of a base paste and only a geometry of an indium-tin-oxide (ITO)-electrode and an electrical connection are printed, and finally, with or without an aqueous polyurethane dispersion coating, a metallized transparent thin foil is laminated on the side of said plastic form body opposite said transparent, plastic foil substrate, said metallized transparent thin foil thereby producing a dielectric and the base electrode, including a reflector.

27. A process according to claim 13, wherein the formed plastic foil substrate is placed in an injection molding die and is back-injected with suitable thermoplastic, wherein at least one window to the interior remains substantially uncovered.

28. A process according to claim 13, wherein the formed plastic foil substrate is placed in an injection molding die and is back-injected with suitable thermoplastic, wherein electrical connection surfaces extend outwardly.

29. A process according to claim 13, further comprising monitoring and controlling the positioning of an indium-tin-oxide (ITO)-screen printing geometry comprising the steps of:

positioning contact fingers comprising an electrical measuring device relative to a conducting surface of said indium-tin-oxide (ITO)-screen printing in accordance with a pre-determined test geometry;

checking an electrical tolerance for at least one predetermined test position, wherein a positive signal is only given whenever the indium-tin-oxide (ITO)-screen printing surface comprises a predetermined tolerance;

evaluating the results in light of the drying state of the layer construction and environmental factors, such as humidity and temperature;

using the measured values for process and operations control of the ITO-screen printing positioning.

30. The method of claim 29, further comprising using said contact fingers to monitor the electrical tolerance of specific regions comprising an insulation layer and/or an electroluminescence layer.

31. A plastic form body having one or more integrated, opto-electronic active luminous fields comprising;

at least one translucent, cold-stretchable, three-dimensionally deformed plastic foil;

graphic printing;

an electro-luminescent layer comprising at least one electro-luminous element at least partially embedded in said graphic printing wherein the electro-luminous element comprises organic or inorganic substances comprising plastically deformable dielectric screen printing colors added as a fine powder or microencapsulated components;

a first conducting surface positioned between the translucent plastic foil and the electro-luminescent layer;

a second conducting surface positioned on the side of the electro-luminescent layer not in contact with the first conducting surface; and a thermoplastic layer applied to the body to comprise a three-dimensional molding, wherein the luminous fields comprise distinct regions of the plastic form body capable of emitting radiation.

32. A plastic form body according to claim 31, wherein the luminous fields are electro-luminescence fields further comprising two electrically insulated electrodes, namely, a first electrode comprising a base electrode and a second electrode comprising a cover electrode; and an electro-luminescence layer between the first electrode and the second electrode.

33. A plastic form body according to claim 32, further comprising at least one dielectric layer or insulation layer located between the electro-luminescence layer and the base electrode, wherein the electrodes and the electro-luminescence layer are applied as a screen printing paste, and the layers formed by screen printing are deformable at an operating temperature below a heat distortion temperature of the plastic foil.

34. A plastic form body according to claim 33, wherein the insulation layer and base electrode comprise a metallized, transparent foil having a thickness of about 20 to 30 $\mu$m laminated on the electro-luminescence layer or on a cover layer positioned on the side of said electroluminescence layer opposite the translucent, cold-stretchable, three-dimensionally deformable plastic foil.

35. A plastic form body according to claim 32, wherein the electro-luminescence layer comprises particles having diameters of substantially 10 to 60 $\mu$m and being substantially insensitive to water vapor.

36. A plastic form body according to claim 32, wherein the cover electrode is a substantially transparent and electrical-conducting electrode comprising indium-tin-oxide (ITO) paste.

37. A plastic form body according to claim 32, wherein the cover electrode comprises an indium-tin-oxide (ITO)-sputter layer or a reflective semi-transparent layer, and is printed as an electric conducting polymer paste in an area of stronger deformation or in areas outside the luminous fields.

38. A plastic form body according to claim 31, further comprising an additional thermoplastic foil on an inner side and/or outer side of the plastic foil, and elements forming a graphic design between the additional thermoplastic foil and the plastic foil.

* * * * *

UNITED STATES PATENT AND TRADEMARK OFFICE
CERTIFICATE OF CORRECTION

PATENT NO.    : 6,411,029 B1
DATED         : June 25, 2002
INVENTOR(S)   : Czak

It is certified that error appears in the above-identified patent and that said Letters Patent is hereby corrected as shown below:

<u>Column 3,</u>
Line 62, "tic form body ID with EL-luminous fields" should read -- tic form body with EL-luminous fields --.

Signed and Sealed this

Eleventh Day of March, 2003

JAMES E. ROGAN
*Director of the United States Patent and Trademark Office*